United States Patent
Innes

(10) Patent No.: US 10,552,873 B2
(45) Date of Patent: Feb. 4, 2020

(54) METHOD AND APPARATUS FOR TRANSMITTING FREQUENCY DIVISION MULTIPLEXED TARGETED IN-STORE ADVERTISEMENTS

(71) Applicant: AT&T Intellectual Property I, L.P., Atlanta, GA (US)

(72) Inventor: Timothy Watson Innes, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 630 days.

(21) Appl. No.: 14/542,526

(22) Filed: Nov. 14, 2014

(65) Prior Publication Data

US 2016/0140612 A1    May 19, 2016

(51) Int. Cl.
*G06Q 30/02* (2012.01)

(52) U.S. Cl.
CPC ..... *G06Q 30/0264* (2013.01); *G06Q 30/0269* (2013.01)

(58) Field of Classification Search
CPC ........................................ G06Q 30/0207–0277
See application file for complete search history.

(56) References Cited

U.S. PATENT DOCUMENTS

| | | | |
|---|---|---|---|
| 7,725,502 B1 * | 5/2010 | Badros | G06Q 30/02 705/14.68 |
| 7,925,549 B2 | 4/2011 | Looney et al. | |
| 8,412,578 B2 | 4/2013 | Roberts | |
| 8,560,396 B2 | 10/2013 | Peckover | |
| 8,566,154 B2 | 10/2013 | Merriman et al. | |
| 8,606,630 B2 | 12/2013 | Fordyce et al. | |
| 8,725,567 B2 | 5/2014 | Huang et al. | |
| 8,744,906 B2 | 6/2014 | Fordyce et al. | |
| 8,843,391 B2 | 9/2014 | Fordyce et al. | |

(Continued)

FOREIGN PATENT DOCUMENTS

| | | |
|---|---|---|
| JP | 2002133270 A | 5/2002 |
| WO | WO 2012028264 A1 | 3/2012 |

OTHER PUBLICATIONS

Williams, Paul, "Where it's at: iBeacons are the next level in geolocation", Mutualmobile, Aug. 26, 2013, pp. 1-6.

(Continued)

*Primary Examiner* — David J Stoltenberg

(57) ABSTRACT

A method, computer-readable storage device and apparatus for transmitting frequency division multiplexed targeted in-store advertisements are disclosed. For example, the method receives a plurality of advertisements from a third party entity, wherein each one of the plurality of advertisements targets one of a plurality of different demographics of customers for a retailer, frequency division multiplexes the plurality of advertisements into the electronic media package, identifies each one of the plurality of different demographics of customers is at the retailer for each one of a plurality of different time periods, and transmits the electronic media package and an instruction regarding which frequency to tune to for each one of the plurality of different time periods based on one of the plurality of different demographics of customers who is at the retailer during the each one of the plurality of different time periods.

20 Claims, 3 Drawing Sheets

(56) References Cited

U.S. PATENT DOCUMENTS

| | | | |
|---|---|---|---|
| 8,874,465 B2 | 10/2014 | Heiser et al. | |
| 2002/0071658 A1* | 6/2002 | Marko | H04H 60/27 |
| | | | 386/241 |
| 2002/0128908 A1 | 9/2002 | Levin et al. | |
| 2002/0144263 A1* | 10/2002 | Eldering | G06Q 30/02 |
| | | | 725/34 |
| 2004/0002897 A1 | 1/2004 | Vishik | |
| 2005/0198686 A1* | 9/2005 | Krause | H04L 29/06027 |
| | | | 725/118 |
| 2005/0210502 A1* | 9/2005 | Flickinger | G06Q 30/02 |
| | | | 725/34 |
| 2005/0222906 A1 | 10/2005 | Chen | |
| 2006/0178918 A1* | 8/2006 | Mikurak | G06Q 10/06 |
| | | | 705/7.25 |
| 2006/0184982 A1* | 8/2006 | Paz | H04N 21/6587 |
| | | | 725/88 |
| 2006/0190964 A1* | 8/2006 | Eldering | H04N 7/165 |
| | | | 725/42 |
| 2006/0288363 A1* | 12/2006 | Kunkel | H04N 7/16 |
| | | | 725/34 |
| 2007/0089127 A1* | 4/2007 | Flickinger | G06Q 30/02 |
| | | | 725/32 |
| 2007/0100698 A1* | 5/2007 | Neiman | G06Q 30/02 |
| | | | 705/14.46 |
| 2008/0306820 A1* | 12/2008 | Passmore | G06Q 30/02 |
| | | | 705/14.53 |
| 2009/0028182 A1* | 1/2009 | Brooks | H04L 41/0896 |
| | | | 370/466 |
| 2009/0028192 A1* | 1/2009 | Rieger | H04H 20/42 |
| | | | 370/535 |
| 2009/0030802 A1* | 1/2009 | Plotnick | G06Q 30/0258 |
| | | | 705/14.56 |
| 2009/0031384 A1* | 1/2009 | Brooks | H04N 21/23439 |
| | | | 725/127 |
| 2009/0055861 A1* | 2/2009 | Knoller | G06Q 30/02 |
| | | | 725/34 |
| 2009/0144201 A1 | 6/2009 | Gierkink et al. | |
| 2009/0157472 A1 | 6/2009 | Burazin et al. | |
| 2009/0187939 A1* | 7/2009 | Lajoie | H04N 7/17318 |
| | | | 725/34 |
| 2009/0307091 A1 | 12/2009 | Lilley | |
| 2010/0082427 A1 | 4/2010 | Burgener et al. | |
| 2010/0094867 A1* | 4/2010 | Badros | G06Q 30/02 |
| | | | 707/725 |
| 2011/0055006 A1* | 3/2011 | Hickman | G06Q 30/02 |
| | | | 705/14.48 |
| 2011/0087547 A1 | 4/2011 | Amaro et al. | |
| 2011/0173655 A1* | 7/2011 | Blumenschein | H04N 21/234 |
| | | | 725/35 |
| 2011/0282733 A1 | 11/2011 | Gnanasambandam et al. | |
| 2011/0288917 A1 | 11/2011 | Wanek et al. | |
| 2012/0192224 A1* | 7/2012 | Eldering | H04N 21/4331 |
| | | | 725/32 |
| 2012/0215639 A1 | 8/2012 | Ramer et al. | |
| 2013/0073387 A1 | 3/2013 | Heath | |
| 2013/0101272 A1* | 4/2013 | Plotnick | G11B 27/005 |
| | | | 386/249 |
| 2013/0238413 A1 | 9/2013 | Carlson et al. | |
| 2013/0297407 A1 | 11/2013 | Hymel | |
| 2014/0019249 A1* | 1/2014 | Nicholas | G06Q 30/0269 |
| | | | 705/14.58 |
| 2014/0337885 A1* | 11/2014 | Eldering | H04N 21/4331 |
| | | | 725/35 |
| 2016/0055535 A1* | 2/2016 | Martinez | G06Q 30/02 |
| | | | 705/14.58 |

OTHER PUBLICATIONS

Dilmener et al., "Location Based Sales Promotion Strategies", ICMC 2013, pp. 1-13.

Bosso et al., "The evolution of brick-and-mortar store: an empirical analysis of technological innovations and multichannel models adopted by physical retailers", Politecnico DiMilano, 2013, pp. 1-196, http://www.politesi,polimi.it/bitstream/10589/82542/1/2013-10-Bosso_Butti.pdf.

* cited by examiner

METHOD AND APPARATUS FOR TRANSMITTING FREQUENCY DIVISION MULTIPLEXED TARGETED IN-STORE ADVERTISEMENTS

BACKGROUND

Advertising is important for retailers to promote items and entice shoppers to purchase items within the store. Currently, advertisements within the store are stagnant and do not change during the day. In other words, advertisements within the store typically are changed infrequently.

In addition, retailers are collecting more and more information about the customers who visit their stores. However, retailers do not currently have a way to leverage the big data analytics related to their customers to tailor the advertising in the store to the customers.

SUMMARY

In one embodiment, the present disclosure provides a method, computer-readable storage device, and apparatus for transmitting an electronic media package. In one embodiment, the method receives a plurality of advertisements from a third party entity, wherein each one of the plurality of advertisements targets one of a plurality of different demographics of customers for a retailer, frequency division multiplexes the plurality of advertisements into the electronic media package, identifies each one of the plurality of different demographics of customers is at the retailer for each one of a plurality of different time periods, and transmits the electronic media package and an instruction regarding which frequency to tune to for each one of the plurality of different time periods based on one of the plurality of different demographics of customers who is at the retailer during the each one of the plurality of different time periods.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to the design of or improvement of targeted advertising and, more particularly, to a method, computer-readable storage device, and apparatus for transmitting frequency division multiplexed targeted in-store advertisements. As discussed above, retailers typically change advertisements inside the store infrequently and the big data that is collected regarding the retailer's customers is not leveraged to properly select an advertisement in the store or for a particular location.

One embodiment of the present disclosure leverages big data analytics of a retailer's customers and sends frequency division multiplexed (FDM) advertisements to the retailer with instructions on how to tune to a particular advertisement in the FDM advertisements based upon an identified demographic group that may be in the store during a particular time period. For example, a communications network service provider may package different advertisements for different products for different demographic groups to a retailer. The communications network service provider may provide instructions to the retailer as to which frequency to tune to for the advertisement that matches the identified demographic group in the store for a current time period. As the demographic changes during different time periods throughout a day, the retailer may simply tune to the appropriate frequency carrying the matching advertisement. In addition, customers who opt-in may have their endpoint devices tune to an appropriate frequency to an advertisement that better matches their respective demographic profile.

Figure 1:
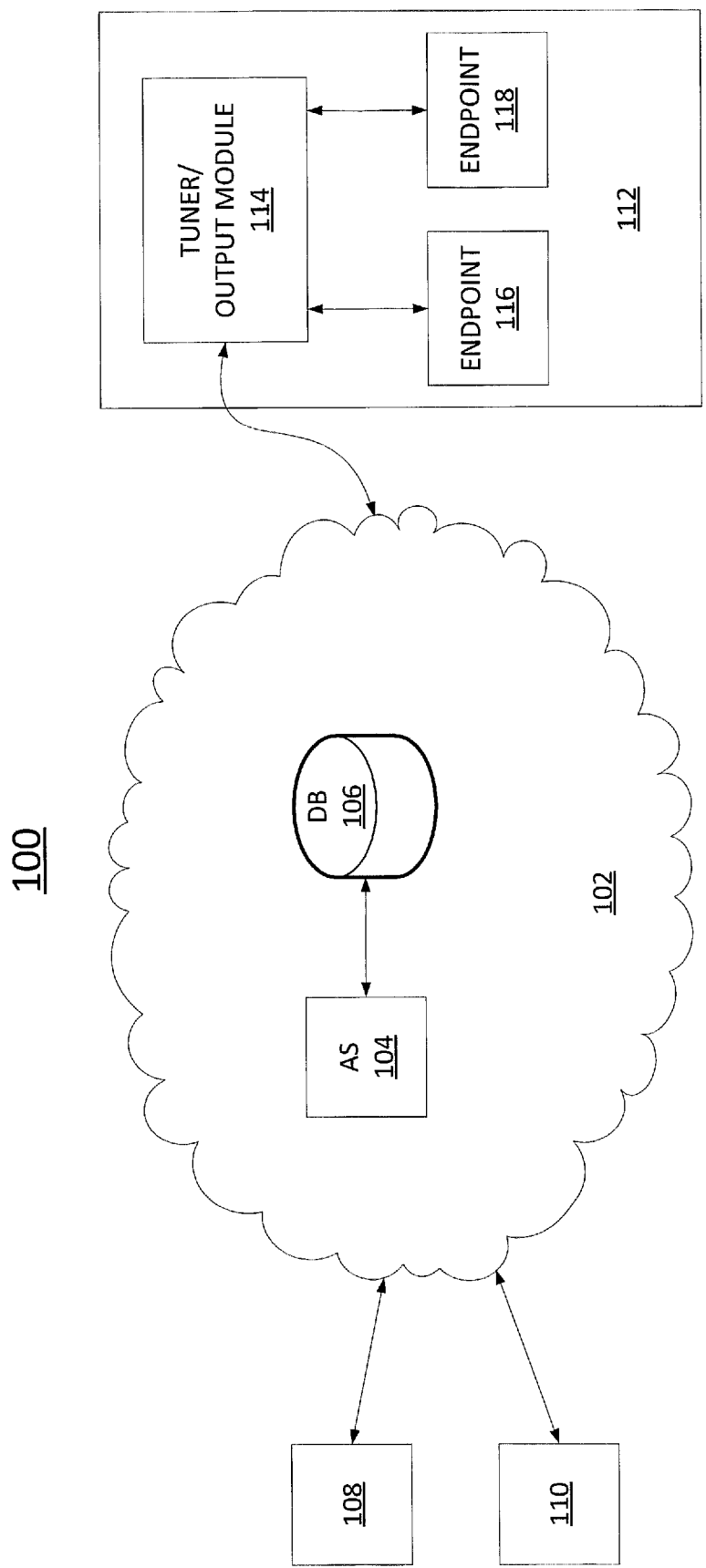
FIG. 1 illustrates one example of a communications network of the present disclosure.

FIG. 1 illustrates an example communication network 100 of the present disclosure. In one embodiment, the communication network 100 may include a core network 102. In one embodiment, the core network 102 may be an Internet Protocol (IP) based communication network operated by a service provider. However, it should be noted that any type of core networks and/or access networks are within the scope of the present invention, e.g., cellular networks, wireless networks and the like.

In one embodiment, the core network 102 may include an application server (AS) 104 and a database (DB) 106. In one embodiment, the AS 104 may be deployed as a dedicated computer illustrated in FIG. 3 and described below and may perform the operations discussed herein.

In one embodiment, the DB 106 may store various information disclosed herein. For example, the DB 106 may store demographic data associated with customers and time periods associated with the demographic data of each one of one or more retailers and each one of the retailers' different locations. The DB 106 may also store advertisements provided by one or more vendors or third party entities 108 and 110. The DB 106 may store the frequency division multiplexed (FDM) advertisements and associated channel information that each advertisement is carried on, as discussed in further detail below.

Although FIG. 1 illustrates the core network 102 only having a single AS 104 and a single DB 106, it should be noted that any number of application servers and databases may be deployed. In addition, it should be noted that core network 102 may include additional network elements not shown, such as for example, border elements, gateways, routers, switches, firewalls, one or more access networks, and the like.

In one embodiment, one or more vendors 108 and 110 may be in communication with the core network 102 and one or more retailers 112 (or retailer locations such as physical stores) may also be in communication with the core network 102. In one embodiment, the retailer may have multiple different locations. Although two vendors 108 and 110 and a single retailer 112 are illustrated in FIG. 1, it should be noted that any number of vendors and retailers may be deployed.

In one embodiment, the vendors 108 and 110 may be an entity that sells a service or a product to customers via the retailer 112. The vendors 108 and 110 may create advertisements for the services or products that are displayed on endpoint devices 116 and 118 at the retailer 112. In one embodiment, the vendors 108 and 110 may create different advertisements for each service or product for different demographic groups of customers. In one embodiment, the advertisements may comprise still images, video displays or video commercials that can be played at the retailer 112.

For example, the vendors 108 and 110 may create an advertisement for a pair of shoes that appeals to women, another advertisement for the same pair of shoes that appeals to men, another advertisement for the same pair of shoes that appeals to Latinos, another advertisement for the same pair of shoes that appeals to Catholics, and the like. In one embodiment, a demographic group may include gender, age, race, religion, location/region, and the like.

In one embodiment, the vendors 108 and 110 may pay the service provider of core network 102 to store and transmit the advertisements to the retailer 112. In one embodiment, the retailer 112 may collect demographic information related to its customers. For example, the demographic information may be collected as part of each transaction that occurs at the retailer. The demographic information may be sent to the core network 102.

In one embodiment, the retailer may pay the service provider of the core network 102 to provide a service for analyzing the demographic information to determine a demographic profile of customers that shop at the retailer during different time periods. The retailer may then use the demographic information for customers during different time periods to display a targeted advertisement on one of the endpoints 116 and 118 at the retailer.

In one embodiment, the service provider may collect all of the advertisements from the vendors 108 and 110 and combine them into a single electronic media package (EMP) via frequency division multiplexing (FDM). The EMP may then be transmitted to the retailer 112 with instructions on which channel to tune to in the EMP that is combined via FDM such that the proper advertisement is displayed via the endpoints 116 and 118 for a targeted demographic of customers.

In one embodiment, the retailer 112 may include a tuner/output module 114 that may be connected to the endpoints 116 and 118 via a wired or wireless connection. For example, the endpoints 116 and 118 may connect wirelessly to the tuner/output module 114 wirelessly over a Wireless Fidelity (Wi-Fi) network or a radio frequency (RF) signal. In one embodiment, the type of advertisements, a target demographic, channel assignments and other information may be inserted into a header file of the frequency division multiplexed EMP. The EMP may be received by the tuner/output module 114 and the appropriate advertisement may be selected by tuning to the appropriate channel on the EMP in accordance with the instructions from the service provider or based on the description information or target demographic information in the header file.

In one embodiment, the demographic of the customers may change throughout the day. For example, women may be more prevalent at the retailer 112 during the hours of 8 AM-12 PM. Customers between the ages of 50-60 may be more prevalent at the retailer 112 during the hours of 12 PM-4 PM. Customers who are from a more affluent income group (e.g., has a salary greater than $250,000 per year) may be more prevalent at the retailer 112 during the hours 4 PM-7 PM, and so forth. Thus, the service provider of the core network 102 may instruct the retailer 112 to tune to a first channel during the hours of 8 AM-12 PM that plays an advertisement targeted to women, tune to a second channel during the hours of 12 PM-4 PM that plays an advertisement targeted to the age group of 50-60 and tune to a third channel during the hours of 4 PM-7 PM that plays an advertisement targeted to an affluent income group, and so on.

In one embodiment, different endpoints 116 and 118 may play advertisements for different products. For example, the endpoint 116 may be tuned to a first channel carrying a targeted advertisement from the vendor 108 and the endpoint 118 may be tuned to a second channel carrying a targeted advertisement from the vendor 110. In addition, each endpoint 116 and 118 may play a different advertisement for a different demographic of customers at different times during the day, as discussed above.

As a result, the service provider may leverage its communication network to send the retailer 112 a plurality of advertisements that are combined via FDM. The advertisements may be transmitted continuously to the tuner/output module 114 at the retailer and the retailer may simply tune to the proper channel to play the proper advertisement.

In one embodiment, the retailer may have multiple different locations in different regions around the country. Each location may have a different demographic of customers during a time period (e.g., 12 PM-4 PM). However, each location may receive the frequency division multiplexed EMP and a different instruction regarding which frequency to tune to in the EMP. Each location may then simply tune to the proper channel to play an advertisement that is targeted for a respective demographic group of customers at the respective location of the retailer. In other words, one advantage of the present disclosure is that different locations of the same retailer may display different advertisements targeted for different demographic groups of customers for the same product by simply tuning to the appropriate channel as instructed by the service provider.

In addition, the service provider of the core network 102 may leverage all of the big data analytics performed on the demographic information related to the customers of the retailer 112 to identify which demographic of customers are in which locations of the retailers during which times of days. Based on this information, the service provider may provide the retailer instructions on which channel to tune to such that the proper advertisement may be played at the retailer.

In one embodiment, if a customer opts in, the customer may provide the service provider with a customer profile. The customer profile may include demographic information related to the customer and information related to what types or brands of products and/or services that the customer likes. Using this information, when the service provider detects that the customer is at a particular location (e.g., via an opt-in to track an endpoint device of the customer), the service provider may send a signal or an instruction to have the endpoint device to tune to a particular channel being sent to the retailer 112.

For example, the customer may be a male who is age 37 at a sporting goods store and like golf equipment. The service provider may send a signal to the customer's endpoint device to tune to a first channel to receive an advertisement for golf balls on sale that are targeted to men between the ages of 30-40. Notably, the advertisement played by the endpoint device of the customer may be different than the advertisement for the same golf balls played on the endpoints 116 and 118 at the retailer.

In one embodiment, a feedback loop may be created by continuously sending customer demographic information to the service provider. For example, all demographic information obtained during each transaction at the retailer may be sent to the core network 102. The AS 104 may continuously analyze the demographic information and update the advertisements that are selected for the retailer 112 if the demographic of customers changes during different time periods.

Figure 2:
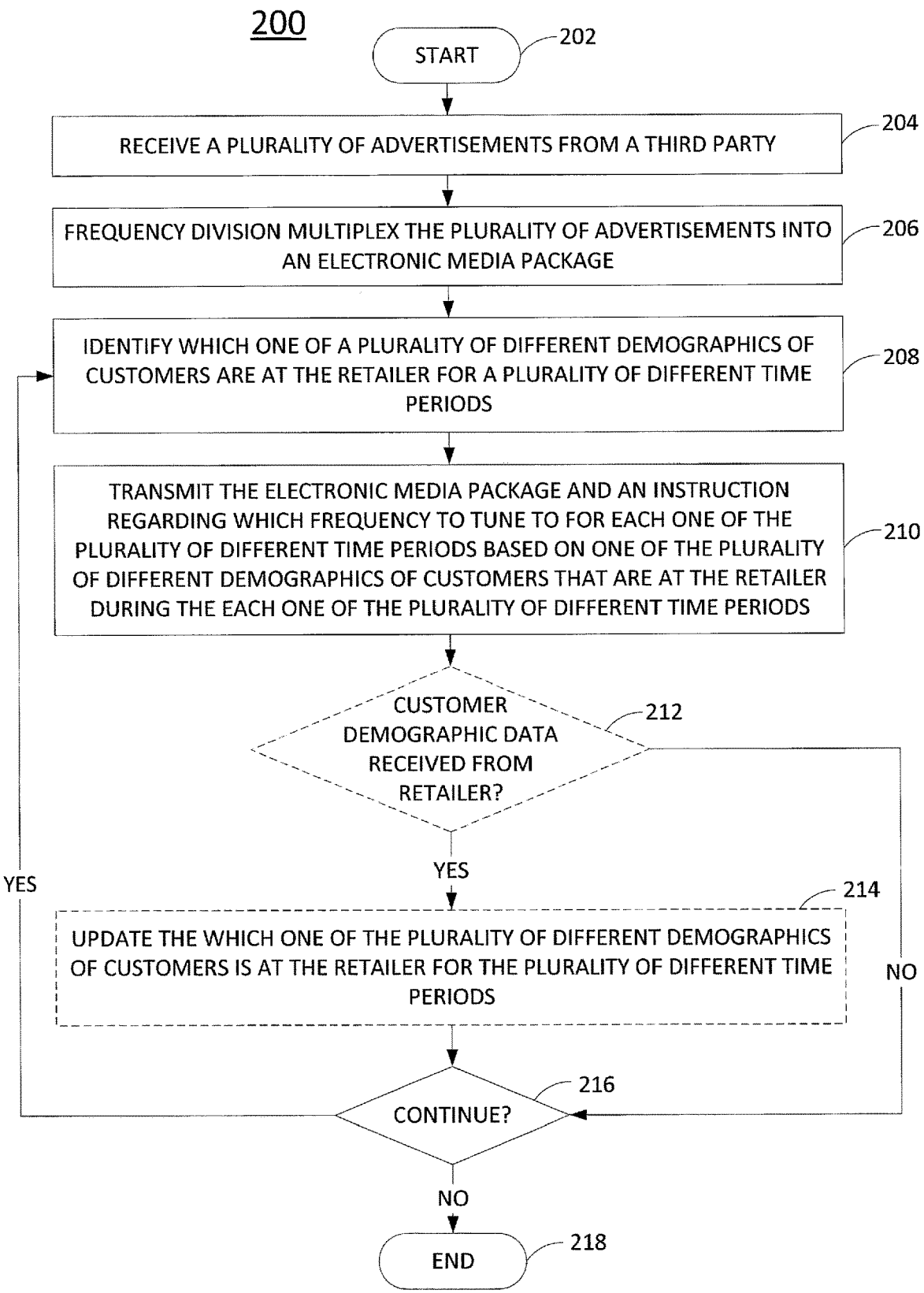
FIG. 2 illustrates an example flowchart of a method for transmitting frequency division multiplexed targeted in-store advertisements.
Figure 3:
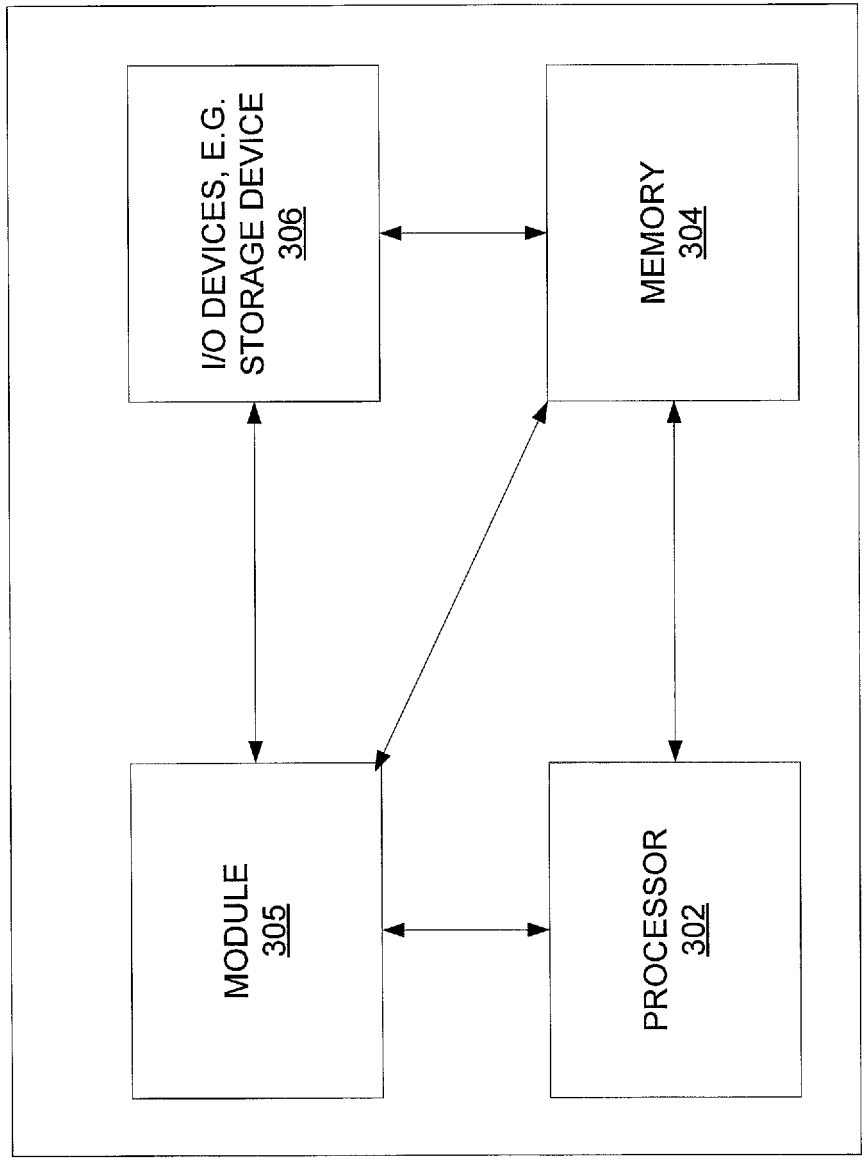
FIG. 3 illustrates a high-level block diagram of a dedicated computer suitable for use in performing the functions described herein.

FIG. 2 illustrates a flowchart of a method 200 for transmitting frequency division multiplexed targeted in-store advertisements. In one embodiment, the method 200 may be performed by the AS 104 or a dedicated computer as illustrated in FIG. 3 and discussed below.

The method 200 begins at step 202. At step 204, the method 200 receives a plurality of advertisements from a third party. In one embodiment, the third party may be a vendor of a product. The vendor may make a plurality of different advertisements for a plurality of different demographics of customers for the product and send the advertisements to the service provider. In one embodiment, the plurality of advertisements may be from a plurality of different vendors for a plurality of different products from each vendor for a plurality of different demographics of customers. In one embodiment, the advertisement may be a still image, a video, a video advertisement and the like.

At step 206, the method 200 frequency division multiplexes the plurality of advertisements into an electronic media package. For example, the service provider may encapsulate all of the advertisements into the EMP via frequency division multiplexing and add a header file that includes information about the advertisements in the EMP, the target demographic for each advertisement, an associated channel to tune to for each advertisement, and the like.

At step 208, the method 200 identifies or predicts which one of a plurality of different demographics of customers are at the retailer for a plurality of different time periods. In one embodiment, the service provider may provide big data analytics for the retailer. For example, the service provider may analyze each transaction of the retailer to predict which demographic of customers are most likely to be at the retailer during different time periods.

At step 210, the method 200 transmits the electronic media package and an instruction regarding which frequency to tune to for each one of the plurality of different time periods based on one of the plurality of different demographics of customers that are at the retailer during the each one of the plurality of different time periods. For example, based on the data sent from the retailer to the service provider, the service provider may determine which demographic of customers are at the retailer during different time periods. The service provider may then determine which advertisements from the vendors should be played at the retailer. The service provider may then instruct the retailer on which channel the retailer should tune to for a particular product in the EMP.

In one embodiment, the service provider may send the same EMP to a plurality of different retailers and/or different locations of each retailer even though each retailer and location has a different demographic of customers. However, each retailer and/or each location may simply tune the retailer's or location's respective tuner/output module to the appropriate channel of the EMP to display the appropriate advertisement targeted to the respective demographic customer at the retailer and/or location.

At optional step 212, the method 200 determines if customer demographic data is received from the retailer. For example, as the micro-targeted advertisements are played at the retail location, the retailer may send back demographic data for each transaction back to the service provider. In other words, a real time feedback loop may be fed back to the service provider to determine if the advertisements are effective and the correct demographic group of customers is being targeted.

If the customer demographic data is not received, the method 200 may proceed to step 216. If the customer demographic data is received, the method 200 may proceed to optional step 214.

At optional step 214, the method 200 updates the which one of the plurality of different demographics of customers is at the retailer for the plurality of different time periods. For example, the demographic modeling and prediction performed by the service provider may be updated with the updated customer demographic data received from the retailer. Over a period of time as the data is continuously received, the identification of which demographic group of customers is at the retail location during which different periods of time may be updated and modified based on the customer demographic data that is received from the retailer.

At step 216, the method 200 determines if the method 200 should continue. If the method should continue, the method 200 may return to step 208 and repeat steps 208-216. However, if the method 200 should stop, the method may proceed to step 218. At step 218, the method 200 ends.

It should be noted that the embodiments of the present disclosure improve the technology of targeted advertising by allowing a service provider to send a plurality of different advertisements electronically packaged via frequency division multiplexing to different retailers and/or locations. Each retailer may then tune to a particular channel to play an advertisement that is targeted for a particular demographic of customers at the respective retailer. In addition, advertisement display systems are improved by providing a simplified system for changing targeted advertisements. For example, the service provider provides instructions on which channel to tune to rather than having an employee manually determine which advertisement should be played at what time of day.

It should be noted that although not explicitly specified, one or more steps or operation of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for transmitting frequency division multiplexed targeted in-store advertisements, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for transmitting frequency division multiplexed targeted in-store advertisements (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for transmitting frequency division multiplexed targeted in-store advertisements (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for transmitting an electronic media package, the method comprising:

receiving, by a processor of an application server of a communication network, a plurality of advertisements from a third party entity, wherein each one of the plurality of advertisements targets one of a plurality of different demographics of customers for a retailer;

frequency division multiplexing, by the processor, the plurality of advertisements into the electronic media package, wherein the each one of the plurality of advertisements is multiplexed onto a respective one of a plurality of different frequencies that is associated with a respective one of the plurality of different demographics of customers for the retailer, wherein each one of the plurality of different frequencies carries a separate signal within the electronic media package;

identifying, by the processor, each one of the plurality of different demographics of customers who is at the retailer for each one of a plurality of different time periods;

transmitting, by the processor, to a tuner module of the retailer, via a single transmission medium, the electronic media package with an instruction regarding which frequency to dynamically tune to for displaying a respective advertisement on an endpoint of the retailer for each one of the plurality of different time periods based on one of the plurality of different demographics of customers who is at the retailer during the each one of the plurality of different time periods, wherein the electronic media package that is transmitted comprises the plurality of advertisements, wherein the each one of the plurality of advertisements may be obtained by tuning to the respective one of the plurality of different frequencies;

receiving, by the processor, customer demographic data from the retailer for the plurality of different time periods; and updating, by the processor, the identifying of the each one of the plurality of different demographics of customers who is at the retailer for each one of the plurality of different time periods by using the customer demographic data.

2. The method of claim 1, wherein one of the plurality of different demographics of customers comprises an age group.

3. The method of claim 1, wherein one of the plurality of different demographics of customers comprises an ethnicity group.

4. The method of claim 1, wherein one of the plurality of different demographics of customers comprises an income group.

5. The method of claim 1, wherein one of the plurality of different demographics of customers comprises a gender group.

6. The method of claim 1, wherein the identifying and the transmitting are repeated periodically to update the instruction for different time periods of the plurality of different time periods.

7. The method of claim 1, wherein the plurality of advertisements comprises different advertisements for a plurality of different products for the plurality of different demographics of customers for the retailer.

8. The method of claim 1, wherein the transmitting comprises transmitting to a plurality of different locations of the retailer, wherein each one of the plurality of different locations is sent a different instruction regarding which frequency to tune to in the electronic media package.

9. A non-transitory computer-readable storage device storing a plurality of instructions, which when executed by a processor of an application server of a communication network, cause the processor to perform operations for transmitting an electronic media package, the operations comprising:

receiving a plurality of advertisements from a third party entity, wherein each one of the plurality of advertisements targets one of a plurality of different demographics of customers for a retailer;

frequency division multiplexing the plurality of advertisements into the electronic media package, wherein the each one of the plurality of advertisements is multiplexed onto a respective one of a plurality of different frequencies that is associated with a respective one of the plurality of different demographics of customers for the retailer, wherein each one of the plurality of different frequencies carries a separate signal within the electronic media package;

identifying each one of the plurality of different demographics of customers who is at the retailer for each one of a plurality of different time periods;

transmitting to a tuner module of the retailer, via a single transmission medium, the electronic media package with an instruction regarding which frequency to dynamically tune to for displaying a respective advertisement on an endpoint of the retailer for each one of the plurality of different time periods based on one of the plurality of different demographics of customers who is at the retailer during the each one of the plurality of different time periods, wherein the electronic media package that is transmitted comprises the plurality of advertisements, wherein the each one of the plurality of advertisements may be obtained by tuning to the respective one of the plurality of different frequencies;

receiving customer demographic data from the retailer for the plurality of different time periods; and updating the identifying of the each one of the plurality of different demographics of customers who is at the retailer for each one of the plurality of different time periods by using the customer demographic data.

10. The non-transitory computer-readable storage device of claim 9, wherein one of the plurality of different demographics of customers comprises an age group.

11. The non-transitory computer-readable storage device of claim 9, wherein one of the plurality of different demographics of customers comprises an ethnicity group.

12. The non-transitory computer-readable storage device of claim 9, wherein one of the plurality of different demographics of customers comprises an income group.

13. The non-transitory computer-readable storage device of claim 9, wherein one of the plurality of different demographics of customers comprises a gender group.

14. The non-transitory computer-readable storage device of claim 9, wherein the identifying and the transmitting are repeated periodically to update the instruction for different time periods of the plurality of different time periods.

15. The non-transitory computer-readable storage device of claim 9, wherein the plurality of advertisements comprises different advertisements for a plurality of different products for the plurality of different demographics of customers for the retailer.

16. The non-transitory computer-readable storage device of claim 9, wherein the transmitting comprises transmitting to a plurality of different locations of the retailer, wherein each one of the plurality of different locations is sent a different instruction regarding which frequency to tune to in the electronic media package.

17. An apparatus for transmitting an electronic media package, the apparatus comprising:

a processor of an application server for a communication network; and a computer-readable storage device storing a plurality of instructions which, when executed by the processor, cause the processor to perform operations, the operations comprising:

receiving a plurality of advertisements from a third party entity, wherein each one of the plurality of advertisements targets one of a plurality of different demographics of customers for a retailer;

frequency division multiplexing the plurality of advertisements into the electronic media package, wherein the each one of the plurality of advertisements is multiplexed onto a respective one of a plurality of different frequencies that is associated with a respective one of the plurality of different demographics of customers for the retailer, wherein each one of the plurality of different frequencies carries a separate signal within the electronic media package;

identifying each one of the plurality of different demographics of customers who is at the retailer for each one of a plurality of different time periods;

transmitting to a tuner module of the retailer, via a single transmission medium, the electronic media package with an instruction regarding which frequency to dynamically tune to for displaying a respective advertisement on an endpoint of the retailer for each one of the plurality of different time periods based on one of the plurality of different demographics of customers who is at the retailer during the each one of the plurality of different time periods, wherein the electronic media package that is transmitted comprises the plurality of advertisements, wherein the each one of the plurality of advertisements may be obtained by tuning to the respective one of the plurality of different frequencies;

receiving customer demographic data from the retailer for the plurality of different time periods; and updating the identifying of the each one of the plurality of different demographics of customers who is at the retailer for each one of the plurality of different time periods by using the customer demographic data.

18. The apparatus of claim 17, wherein one of the plurality of different demographics of customers comprises an age group.

19. The apparatus of claim 17, wherein one of the plurality of different demographics of customers comprises an ethnicity group.

20. The apparatus of claim 17, wherein one of the plurality of different demographics of customers comprises an income group.

* * * * *